United States Patent [19]

Annen et al.

[11] Patent Number: 4,894,065

[45] Date of Patent: Jan. 16, 1990

[54] METHOD FOR PRODUCING WOOL DYEINGS OF IMPROVED LEVELNESS AND DYE MIXTURES USEFUL THEREFOR: PARAMETERS FOR COMBINATION CAPACITY AND COMPENSATION OF VARIABLE AFFINITY FOR WOOL FROM ROOT TO TIP OF FIBER

[75] Inventors: Oskar Annen, Aesch; Wolfgang Beck, Basel; Josef Frauenknecht, Therwil, all of Switzerland

[73] Assignee: Sandoz Ltd., Basel, Switzerland

[21] Appl. No.: 163,444

[22] Filed: Mar. 3, 1988

[30] Foreign Application Priority Data

Mar. 4, 1987 [DE] Fed. Rep. of Germany ....... 3706909

[51] Int. Cl.$^4$ ..................... C09B 67/22; C09B 69/04; D06P 1/60; D06P 3/16
[52] U.S. Cl. ......................................... 8/638; 8/543; 8/639; 8/641; 8/673; 8/676; 8/680; 8/681; 8/685; 8/917

[58] Field of Search .................... 8/638, 641, 646, 680

[56] References Cited

U.S. PATENT DOCUMENTS 4,411,665 10/1983 Egli et al. ............................... 8/455
4,444,564 4/1984 Salathe et al. .......................... 8/588

FOREIGN PATENT DOCUMENTS 1489456 10/1977 United Kingdom .

Primary Examiner—A. Lionel Clingman
Attorney, Agent, or Firm—Gerald D. Sharkin; Richard E. Vila; Thomas C. Doyle

[57] ABSTRACT

The invention refers to a mixture of anionic dyestuffs having a skitteriness value at pH5 of 3-4 and a combinability value at pH5 of 4-5 and to a process for dyeing a fiber material comprising wool with such a mixture of dyestuffs. These mixtures of anionic dyestuffs give surface and fiber level dyeings.

21 Claims, No Drawings

METHOD FOR PRODUCING WOOL DYEINGS OF IMPROVED LEVELNESS AND DYE MIXTURES USEFUL THEREFOR: PARAMETERS FOR COMBINATION CAPACITY AND COMPENSATION OF VARIABLE AFFINITY FOR WOOL FROM ROOT TO TIP OF FIBER

The present invention relates to a method for determining a skitteriness value of anionic wool dyestuffs and to mixtures of anionic dyestuffs having specific skitteriness and combinability values and which give surface and fibre level dyeings on wool or wool/polyamide fibre blends.

The unlevel dyeing of individual wool fibres, which is intensified in a wool nap surface is still a real problem for the wool colourist. As a natural product, the individual wool fibre can have a variable dye affinity due to irregular damage generated during growth. The resulting difference in the dye affinity leads between tip and root of the fibre to skittery dyeings on wool.

A method has now been found for determining the ability of an anionic dye to compensate for the tip/root difference in affinity of wool fibres for anionic dyestuffs.

According to the invention, the determination of the ability of an anionic dyestuff to compensate for the tip/root difference in affinity of wool fibres is carried out as follows. First two anionic dyestuffs having a different distribution between roots and tips of wool fibres under the same dyeing conditions are selected as standard dyestuffs as described below. A dyebath containing 1% by weight of a levelling agent having affinity for anionic dyestuffs and based on the quaternized reaction product of 2 mols aminosulphonic acid with 1 mol tallow amine ethoxylated with 20 ethylene-oxy groups, 3% by weight sodium acetate and the dyestuffs to be tested, is adjusted to pH 5 with acetic acid and heated to 50° C. The indicated percentages are based on the weight of the material to be dyed and the amount of dyestuff corresponds to that required to obtain a 1/1 standard depth dyeing, each dyestuff contributing to ½ of the standard depth. The liquor to goods ratio is 30:1. When the temperature of 50° C. is reached, a sample of 2.5 g untreated wool gabardine and a sample of 2.5 g shrinkproofed wool are introduced into the dyebath. By shrink-proofed wool is meant a wool which has been chlorinated with 4% by weight of Basolan DC (Registered Trademark, BASF, W. Germany). The dyebath is then heated to 98° C. at a rate of 1° C./min and the two samples are dyed for 60 minutes at 98° C. Thereafter the two samples are removed from the dyebath, rinsed with cold water and then dried, and their resulting shades are compared. The wool gabardine sample corresponds in its dyeing behaviour to the dye affinity of wool roots (hydrophobic part) and the Basolan DC treated wool sample corresponds in its dyeing behaviour to the dye affinity of the wool tips (hydrophilic part). On the basis of this method, the following standard dyestuffs are selected: C.I. Acid Orange 168 to which a $SK'_{pH5}$-value of 1 is attributed and C.I. Acid Blue 227 to which a $SK'_{pH5}$-value of 5 is attributed. The former is distributed as follows: 70% on the chlorinated wool and 30% on the untreated gabardine wool. The latter is distributed in the opposite ratio: 30% on the chlorinated wool and 70% on the untreated wool gabardine.

The same method is applied to determine the skitteriness value SK' of other dyestuffs. In this case, there is added to the dyebath having the same composition as indicated above, one or two standard dyestuffs whose SK'-value is known together with the dyestuff whose SK'-value is to be determined, in an amount such as to obtain a total standard dyeing depth of 1/1, each dyestuff contributing to the same ratio of the standard dyeing depth. The resulting two dyed samples are compared with the reference samples dyed with the standard dyestuffs, e.g. as described in the preceding paragraph; the dyestuff distribution between the two samples and the corresponding colouration is evaluated and a skitteriness value between 1 and 5 based on this evaluation is attributed to the dyestuff.

The present invention also provides a mixture of anionic dyestuffs which has a skitteriness value SK' at pH 5 from 3 to 4 and a combinability value K' at pH 5 from 4 to 5. There is furthermore provided a process for dyeing a fibre material comprising wool, which process comprises contacting the material at a pH 4.0 to 6.0 and at a temperature from 60° to 105° C. with an aqueous dyeing liquor containing a mixture of anionic dyestuffs as disclosed above and a levelling agent.

The K'-value is usually employed to indicate the combination capacity of anionic dyestuffs: it is a dyestuff parameter which provides a practical indication of the behaviour in dyeing of an anionic dyestuff in relation with its combination capacity with other anionic dyestuffs [see GB Patent 1,489,456; Otten H. G., Bayer Farbenrevue, 21, 32 (1972); Beckmann W., Hoffmann F., and Otten H. G., Melliand Textilber. 6, 641 (1973); and Atherton E., Downey D. A. and Peters R. H. in J.S.D.C., 74, 242 (1958)]. This K'-value which usually may vary from 1 to 10, is experimentally determined at pH 5 in the presence of a cationic levelling agent by reference with a standard anionic dyestuff with known $K'_{pH5}$-value as follows:

A dyebath containing 1% by weight of a levelling agent having affinity for anionic dyestuffs as disclosed above for the determination of the SK'-values, 3% by weight sodium acetate, a standard dyestuff with known $K'_{pH5}$-value and the dyestuff to be tested, is adjusted with acetic acid to pH 5 and then heated to 50° C. The amount of dyestuffs is selected in order to obtain a total standard dyeing depth of 2/1 (1/1 standard dyeing depth for each dyestuff). The liquor to goods ratio is 30:1. A sample of 2.5 g untreated wool gabardine is introduced in the dyeing liquor at 50° C. which is then heated to 98° C. at a heating rate of 1° C./min. As soon as the temperature has reached 80° C., the sample is removed from the dyeing liquor and replaced by an undyed sample of 2.5 g of the same wool quality. After 15 minutes dyeing at 98° C. the wool sample introduced at 80° C. is removed from the dyeing liquor and again replaced by 2.5 g of an undyed wool sample of the same quality. After 15 minutes at 98° C., this third wool sample is removed from the dyeing liquor. Each sample is rinsed and dried under the same conditions. The $K'_{pH5}$-value of the dyestuff to be tested is evaluated by comparing the shades of the different samples and the remainder (obtained by dyeing with the exhausted bath under the same dyeing conditions). For example, the tested dyestuff will have a $K'_{pH5}$-value smaller than that of the standard dyestuff when the shade of the first sample matches the shade of the tested dyestuff and the shades of the third sample and of the remainder correspond to the shade of the standard dyestuff. Conversely, the tested dyestuff will have a $K'_{pH5}$-value higher than that of the standard dyestuff when the shade of the first sample matches the shade of the standard dyestuff and the shades of the third sample and of the remainder correspond to the shade of the tested dyestuff.

Examples of standard dyestuffs which can be used for determination of the $K'_{pH5}$-value of the dyestuffs are C.I. Acid Red 404 ($K'_{pH5}=5$), C.I. Acid Yellow 235 ($K'_{pH5}=3$) and C.I. Acid Yellow 129 ($K'_{pH5}=1$). The $K'_{pH5}$-value of the standard dyestuffs may be determined first, based on the same method but using two dyestuffs having an opposite build-up rate on untreated wool gabardine.

The mixture of dyestuffs of the invention are then obtained by mixing the desired anionic dyestuffs with specific SK' and K'-values in such a weight ratio that the resulting mixture has the required SK' and K'-values. This ratio can be determined by calculations taking into account the difference between the SK' and K'-values of the dyestuffs with the SK' and K'-values desired for the mixutre, respectively and/or by experimental testing according to the methods disclosed above.

The mixture of the invention can be produced from two or more anionic dyestuffs belonging to various dyestuff classes, e.g. 1:1 or 1:2-metal complexes containing water-solubilizing groups e.g. sulphonic acid groups or which are free from such groups, acid milling dyestuffs or acid dyestuffs with one or more sulphonic acid groups (in free or salt form), and reactive dyestuffs including metal complex dyestuffs containing one or more fibre-reactive groups.

Preferred mixtures of the invention are those based on the following anionic dyestuffs: C.I. Acid Yellow 235, C.I. Acid Yellow 151, C.I. Acid Red 404, C.I. Acid Red 399, C.I. Acid Red 217, C.I. Acid Blue 296, C.I. Acid Blue 193, C.I. Acid Blue 227, C.I. Acid Black 170, C.I. Acid Black 222, C.I. Acid Black 194, C.I. Acid Orange 80, C.I. Acid Violet 66, C.I. Acid Orange 168, C.I. Acid Yellow 218, C.I. Reactive Yellow 69, C.I. Acid Red 412, C. I. Acid Red 129, C.I. Acid Blue 80, C.I. Acid Blue 127.

As will be appreciated, mixtures of anionic dyestuffs according to the invention may be combined for trichromatic dyeing.

The levelling agent used in the dyeing process of the invention may be non-ionic, anionic or cationic. Preferably such compounds have affinity for the anionic dyestuffs. Preferred cationic levelling agents are acid esters of polybasic acids which contain as an ester group the residue of a polyglycol ether derivative, containing an average of 10 to 100 ethylene-oxy groups, of at least one primary fatty monoamine, particularly commpounds of formula I

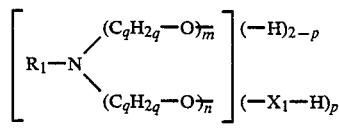

in which
R₁ is C₁₂₋₂₄ alkyl or alkenyl
X₁ is the anion of a polybasic acid,
m and n represent whole numbers the sum of which is 10 to 100,
p is 1 or 2,
q is 2, 3 or 4 and their protonation or quaternization products.

In the compounds of formula I, R₁ is preferably C₁₆₋₂₄ alkyl or alkenyl or a mixture thereof and the sum m+n is preferably 10 to 70. Preferred esters of formula I are sulphuric esters or sulphuric half esters, more preferably the latter. More preferred sulphuric esters and half esters are those containing from 15 to 25 ethyleneoxy groups per molecule.

Particularly preferred compounds of formula I are compounds of formula Ia

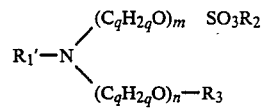

in which
R'₁ is C₁₈₋₂₂ alkyl or alkenyl or a mixture thereof
R₂ is hydrogen, sodium, potassium, ammonium or substituted ammonium
R₃ is hydrogen or a group —SO₃R₂
q is 2, 3 or 4 and m+n is from 17 to 23, and their protonation or quaternization products.

Substituted ammonium as R₂ is preferably an ammonium substituted by up to three β-, δ- or ω-hydroxy-C₂₋₄alkyl groups, e.g. mono-, di- or triethanolammonium.

Suitable protonating and quaternizing agents include hydrochloric acid, hydrobromic acid, dimethylsulphate, methyl or ethyl chloride or bromide and benzyl chloride.

Preferred anionic levelling agents are for example alkyl C₆₋₁₂ aryl sulphonic acids, alkanesulphonic acids, aminoalkylsulphonic acid amides of C₁₄₋₂₄ fatty acids, sulphonated C₁₄₋₂₄ fatty acids and esters thereof, especially methyl, ethyl, propyl or butyl ester, or the glycerine ester of these fatty acids, for example castor oil, alkyl phosphoric acid esters and half esters, alkyl polyglycol ether phosphoric acid esters and condensation products of naphthalenesulphonic acids with formaldehyde or a compound liberating formaldehyde. Preferred phosphates are compounds of formula II

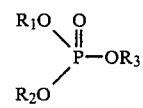

in which each R₁, R₂ or R₃, independently, is C₁₋₁₀ alkyl or C₂₋₆-alkoxy-C₂₋₄alkyl.

Suitable non-ionic levelling agents include polyglycol ethers of fatty (C₁₀₋₂₄) alcohols and of phenols substituted by one or more alkyl groups containing a total of 4 to 16 alkyl carbon atoms. By polyglycol is meant the addition of ethylene oxide or ethylene oxide and propylene oxide, preferably the former. Preferred non-ionic levelling agents are the addition products of 15 to 120, particularly 25 to 120 ethyleneoxy groups to C₁₂₋₂₂ fatty alcohols and the addition products of 4 to 10 ethyleneoxy groups to (C₆₋₁₄ mono- or di-alkyl) phenols. The fatty residue of the alcohols may be saturated or unsaturated alkyl or alkenyl or a mixture thereof.

Mixtures of levelling agents may also be used.

The levelling agent is advantageously used in an amount of from 0.1 to 3% by weight, preferably 0.5 to 2% by weight based on the weight of the substrate to be dyed.

In addition to the dyestuffs and the levelling agents, the dyeing liquor advantageously contains an acid to set the pH within the range 4–6, preferably close to the isoelectric point. Examples of suitable acids are inorganic acids such as sulphuric acid or phosphoric acid, or organic acids, advantageously a lower aliphatic carboxylic acid such as formic, acetic or oxalic acid.

The dyeing liquor may also contain salts, in particular ammonium or alkali metal salts, for example ammonium sulphate or sodium acetate, chloride or sulphate, preferably sodium acetate. These salts are preferably used in an amount of 0.1 to 10% by weight based on the weight of the fibre material.

The dyeing liquors may also contain further additives such as wool-protecting or wetting agents or defoamers.

The goods to liquor ratio can vary within a wide range, advantageously from 1:5 to 1:40, preferably 1:8 to 1:25.

The dyeing process of the invention may be carried out at the boil at 95°–105° C. as well as at a lower temperature, e.g. within the range of 60° to 95° C., preferably 80° to 90° C. The latter temperature range is of particular advantage since it has a preserving action on the wool fibres.

The mixtures of anionic dyestuffs of the invention are suitable for dyeing wool fibre material, e.g. natural wool or chlorinated, carbonized or shrinkproofed wool (for example machine washable wool according to the International Wool Secretary standards), or synthetic polyamide/wool fibre blends. The fibre material can be dyed at various stages in processing, for example as loose material, tops, yarn and piece goods, e.g. knitted or woven goods, fully fashioned articles or carpets.

The fibre material can be dyed according to known methods, preferably by exhaust. The levelling agent may be added to the dyeing liquor before or simultaneously with the addition of the dyestuff mixture. Preferably, the fibre material to be dyed is introduced in the dyeing liquor containing the acid and levelling agent before adding the dyestuff mixture. After addition of the dyestuff mixture, the dyeing liquor is heated to the desired dyeing temperature at an appropriate heating rate and dyeing is continued for 10 to 50 minutes at the desired dyeing temperature. Wool/synthetic polyamide blends may be dyed by exhaust, in a single bath.

Due to their dyeing profile, the mixtures of anionic dyestuffs of the invention exhibit the following interesting properties:

they are combinable
excellent compensation of the difference of dye affinity shown by the wool fibres and good penetration of the dyestuffs in the mate rial
uniform dyeing behaviour, tone-in-tone dyestuff uptake in the heating and dyeing phase
good wet fastness properties corresponding to the wool standard levels
good reproducibility of dyeing recipes
a high dyeing liquor exhaustion
good water-solubility.

The following examples illustrate the invention without limiting its scope. The percentages are weight percentages and the temperature are in degrees Centigrade.

EXAMPLE 1

To 2000 parts water at 40° there are added:
100 parts wool
1 part of a levelling agent based on the quaternized addition product of 2 mols aminosulphonic acid with tallow fatty amine ethoxylated with 20 mols ethylene oxide
1.5 parts of the dyestuff mixture ($SK'_{pH5}=3.5$ and $K'_{pH5}=4.5$) containing
85.0 parts of the dyestuff C.I. Acid Red 404
15.0 parts of the dyestuff C.I. Acid Red 399
and 2 parts sodium acetate.

The dyebath is adjusted to pH 5 and then heated to 98° C. in the course of 30 minutes. After dyeing for 30 minutes at 98° C., the dyebath is cooled to 60° C., the dyed wool is rinsed and then dried.

Level fibre and surface dyeings with good fastness properties are obtained.

EXAMPLE 2

A dyebath containing
2000 parts of water at 40°
100 parts worsted wool
1 part of an anionic levelling agent based on tri-n-butoxyethyl phosphate
1 part of the dyestuff mixture of example 1, and
2 parts sodium acetate
is adjusted to pH 4.5 with acetic acid and then heated at 80° in the course of 20 minutes. Dyeing is continued at this temperature for 60 minutes. Thereafter the dyebath is cooled to 60° and the dyed material rinsed and dried.

Wool dyed in a level shade and having a good spinning ability is thus obtained.

EXAMPLE 3

The procedure of Example 1 is repeated but using 1.2 parts of a dyestuff mixture ($K'_{pH5}=4.5$ and $SK'_{pH5}=3.5$) containing 89.5 parts of the dyestuff C.I. Acid Yellow 235 and 10.5 parts of the dyestuff C.I. Acid Yellow 151. Level dyeings with good fastness properties are obtained.

EXAMPLE 4

The procedure of Example 1 is repeated but using 0.9 parts of a dyestuff mixture ($K'_{pH5}$-value$=4.5$ and $SK'_{pH5}=3.5$) containing 45.4 parts of the dyestuff C.I. Acid Orange 80, 40.6 parts of the dyestuff C.I. Acid Violet 66, 7.4 parts of the dyestuff C.I. Acid Black 194 and 6.6 parts of the dyestuff C.I. Acid Orange 168. Level dyeings with good fastness properties are obtaind.

What is claimed is:

1. A mixture of anionic dyestuffs, each anionic dyestuff having a skitteriness value SK' at pH5 in the range 1 to 5 and a combinability value K' at pH5 in the range 1 to 10 and said dyestuffs being present in a weight ratio such that the mixture has a value SK' at pH5 of from 3 to 4 and a value K' at pH5 of from 4 to 5.

2. A mixture according to claim 1, in which each anionic dyestuff has a skitteriness value SK' at pH5 between 1 and 5 as determind by dyeing at 98° C. for 60 minutes with a liquor to goods ratio of 30:1 an untreated shrinkproofed wool gabardine sample and a shrinkproofed wool sample with a dyebath containing 1% by weight of a levelling agent having affinity for anionic dyestuffs, 3% by weight sodium acetate and the dyestuff to be tested and a standard dyestuff whose $SK'_{pH5}$-value is known in an amount of each dyestuff such as to contribute the same ratio of a 1/1 standard depth dyeing and adjusted at pH5, evaluating the dyestuff distribution between the two samples and comparing with the standard dyestuff.

3. A mixture according to claim 1, in which each anoinic dyestuff has a combinability value K' at pH5 as determind by dyeing three untreated wool gabardine samples at a liquor to goods ratio of 30:1 with a dyebath having a pH of 5 and containing 1% by weight of a levelling agent having affinity for anionic dyestuffs, 3% by weight sodium acetate, the dyestuff to be tested and a standard dyestuff whose K' pH5-value is known, each dyestuff in an amount to obtain a 1/1 standard depth, each sample at a different temperature, the first from 50° C. to 80° C., the second from 80° C. to 98° C. and for 15 minutes at 98° C., the last at 98° C. for 15 minutes, the temperature of the dyebath being raised from 50° C. to 98° C. at a rate of 1° C. per minute, and comparing the shade of each resulting sample and of the remainder exhaust sample.

4. A mixture according to claim 1, containing two or more anionic dyestuffs selected from 1:1 to 1:2-metal complexes containing sulphonic acid groups, acid milling dyestuffs or acid dyestuffs with one or more sulphonic acid groups in free or salt form, and reactive dyestuffs containing one or more fiber-reactive groups.

5. A mixture according to claim 1, in which the anionic dyes are selected from the dyestuffs C.I. Acid Yellow 235, C.I. Acid Yellow 151, C.I. Acid Red 404, C.I. Acid Red 399, C.I. Acid Red 217, C.I. Acid Blue 296, C.I. Acid Blue 193, C.I. Acid Blue 227, C.I. Acid Black 170, C.I. Acid Black 222, C.I. Acid Black 194, C.I. Acid Orange 80, C.I. Acid Violet 66, C.I. Acid Orange 168, C.I. Acid Yellow 218, C.I. Reactive Yellow 69, C.I. Acid Red 412, C.I. Acid Red 129, C.I. Acid Blue 80 and C.I. Acid Blue 127.

6. A mixture according to claim 1 for trichromatic dyeing.

7. A mixture according to claim 2 wherein the levelling agent used to determine the skitteriness value is the quaternized reaction product of 2 mols aminosulphonic acid with 1 mol tallow amine ethoxylated with 20 ethyleneoxy groups.

8. A mixture according to claim 3 wherein the levelling agent used to determine the combinability value is the quaternized action product of 2 mols aminosulphonic acid with 1 mol tallow amine ethoxylated with 20 ethyleneoxy groups.

9. A process for dyeing a fibre material comprising wool, which process comprises contacting the material with an aqueous dyeing liquor at a pH 4.0 to 6.0 and at a temperature from 60° to 105° C., said aqueous dyeing liquor containing a mixture of anionic dyestuffs which has a skitteriness value SK' at pH5 from 3 to 4 and a combinability value K' at pH5 from 4 to 5, and a levelling agent.

10. A process according to claim 9, in which the levelling agent is non-ionic, anionic or cationic.

11. A process according to claim 9, in which the levelling agent is selected from a group consisting of a compound of formula I

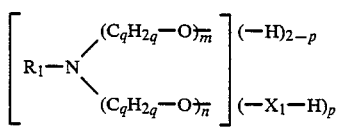

in which
R$_1$ is C$_{12-24}$ alkyl or alkenyl
X$_1$ is the anion of a polybasic acid,
m and n represent whole numbers the sum of which is 10 to 100,
p is 1 or 2,
q is 2, 3 or 4 and their protonation or quaternization products, alkyl C$_{6-12}$ arylsulphonic acids, alkanesulphonic acids, aminoalkylsulphonic acid amides of C$_{14-24}$ fatty acids, sulphonated C$_{14-24}$ fatty acids and esters thereof, alkyl phosphoric acid esters and half esters, alkyl polyglycolether phosphoric acid esters, condensation products of naphthalene-sulphonic acids with formaldehyde or a compound liberating formaldehyde, and fatty C$_{10-24}$ alcohol or (C$_{4-16}$alkyl) phenol polyglycol ethers.

12. A process according to claim 9 which is carried out at a temperature in the range 80° to 90° C.

13. A process according to claim 9 which is an exhaust dyeing.

14. A process according to claim 9 wherein the amount of leveling agent is 0.1 to 3%, by weight, based on the weight of the material to be dyed.

15. A process according to claim 9 wherein the anionic dyestuffs are selected from the dyestuffs C.I. Acid Yellow 235, C.I. Acid Yellow 151, C.I. Acid Red 404, C.I. Acid Red 399, C.I. Acid Red 217, C.I. Acid Blue 296, C.I. Acid Blue 193, C.I. Acid Blue 227, C.I. Acid Black 170, C.I. Acid Black 222, C.I. Acid Black 194, C.I. Acid Orange 80, C.I. Acid Violet 66, C.I. Acid Orange 168, C.I. Acid Yellow 218, C.I. Reactive Yellow 69, C.I. Acid Red 412, C.I. Acid Red 129, C.I. Acid Blue 80 and C.I. Acid Blue 127.

16. A process according to claim 9 wherein the goods to liquor ratio is in the range 1:5 to 1:40.

17. A process according to claim 11 wherein any leveling agent of formula I is a compound of formula Ia

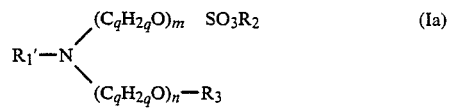

in which
R'$_1$ is C$_{18-22}$ alkyl or alkenyl or a mixture thereof
R$_2$ is hydrogen, sodium, potassium, ammonium or substituted ammonium
R$_3$ is hydrogen or a group —SO$_3$R$_2$
q is 2, 3 or 4 and m+n is from 17 to 23, or a protonation or quaternization product thereof;
any ester of a sulphonated C$_{14-24}$ fatty acid is a methyl, ethyl, propyl, butyl or glycerine ester;
any phosphoric acid ester is a compound of formula II

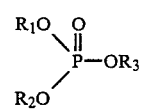

wherein each of R$_1$, R$_2$ and R$_3$, independently, is C$_{1-10}$alkyl or C$_{2-6}$ alkoxy-C$_{2-4}$ alkyl; and any polyglycol ether of a fatty alcohol or phenol is selected from addition products of 15 to 120 ethyleneoxy groups to C$_{12-22}$ fatty alcohols and addition products of 4 to 10 ethyleneoxy groups to (C$_{6-14}$ mono- or di-alkyl) phenols.

18. A process according to claim 11 wherein the amount of leveling agent is 0.1 to 3%, by weight, based on the weight of the material to be dyed.

19. A process according to claim 11 wherein the anionic dyestuffs are selected from the dyestuffs C.I. Acid Yellow 235, C.I. Acid Yellow 151, C.I. Acid Red 404, C.I. Acid Red 399, C.I. Acid Red 217, C.I. Acid Blue 296, C.I. Acid Blue 193, C.I. Acid Blue 227, C.I. Acid Black 170, C.I. Acid Black 222, C.I. Acid Black 194, C.I. Acid Orange 80, C.I. Acid Violet 66, C.I. Acid Orange 168, C.I. Acid Yellow 218, C.I. Reactive Yellow 69, C.I. Acid Red 412, C.I. Acid Red 129, C.I. Acid Blue 80 and C.I. Acid Blue 127.

20. A process according to claim 19 wherein the amount of leveling agent is 0.1 to 3%, by weight, based on the weight of the material to be dyed.

21. A process according to claim 20 which is carried out at a temperataure in the range of 80° to 90° C.

* * * * *